3,278,459
METHOD OF MAKING A POLYETHER USING A DOUBLE METAL CYANIDE COMPLEX COMPOUND
Robert Johnston Herold, Akron, Ohio, assignor to The General Tire & Rubber Company, Akron, Ohio, a corporation of Ohio
No Drawing. Filed Feb. 14, 1963, Ser. No. 258,603
6 Claims. (Cl. 260—2)

The present invention relates to doube metal cyanide complexes useful as catalysts, to methods for making said catalysts, to the polymerization of epoxides and oxetanes utilizing such catalysts, and to the polymers obtained thereby.

It is an object of the present invention to provide double metal cyanide complexes useful as catalysts.

It is another object of this invention to provide a method for making double metal cyanide complexes useful as catalysts.

Still another object is to provide a method for polymerizing epoxides and/or oxetanes using as a catalyst a double metal cyanide complex.

A further object is to provide polymers of epoxides and/or oxetanes having a substantially high molecular weight, some of which are essentially amorphous, by the polymerization of epoxide and/or oxetane monomers using as catalysts double metal cyanide complexes.

These and other objects and advantages of the present invention will become more apparent to those skilled in the art from the following detailed description and examples.

According to the present invention it has been discovered that certain double metal cyanide complexes are useful as catalysts (or as initiators as they can be consumed during polymerization) for the polymerization of organic compounds having at least one ring of from 2 to 3 carbon atoms and one oxygen atom like ethylene oxide, propylene oxide, allyl glycidyl ether, oxetane, and so forth.

Many of the polymers obtained by the method of this invention are entirely or almost entirely amorphous in contrast to the polymers of similar organic oxides obtained using other catalysts. On the other hand, some of the polymers obtained such as those from isobutylene oxide are entirely crystalline or resinous so that they can be used to make hard and tough articles of manufacture. The rubbery polymers prepared using the catalysts of this invention are free of gel. In certain cases where diepoxides or dioxetanes are also copolymerized with the epoxide or oxetane monomers some gel may be observed. Although these rubbery or elastomeric polymers when unstretched are amorphous as shown by X-ray, they do show some indication of orientation on stretching. Many of these polymers are linear and have very little branching depending on the type of monomers used. Polymers having very high viscosities are obtained by the present invention which still are millable, forming smooth sheets on the rubber mill, processable, extrudable and so forth. Gum stocks exhibit high elongation and are snappy. In contrast to many polymers, the polymers of the present invention exhibit high solution viscosities yet low Mooney viscosities. These rubbers, also, exhibit the good low temperature stiffening properties of the nitrile rubbers.

A tubeless tire comprises a tread portion and sidewalls which may be extruded from one piece of stock. The tread or the entire rubbery material of the tire can be one of the amorphous polymers or copolymers of this invention. Of course, when white sidewall tires are being made, the tread and sidewalls can be extruded separately. There can be one or more plies depending on the service for which the tire is designed. The fabric plies comprise rayon or nylon fabric or other textile fabric calendered or coated with rubbery material. The ends of the fabric plies are generally wrapped around beads which can comprise steel wires, and the inner surface of the tire contains a layer of a butyl rubber (a copolymer of about 90–99.5% isobutylene and the balance a diolefin of from 4 to 8 carbon atoms) compound or composition or other suitable material (such as a copolymer of the present invention of the desired thickness) for preventing diffusion of air or gas from the interior of the tire. The butyl may be precured or partially precured. Where the tire is to be used with a tube, the butyl liner can be omitted. The tire can be built by conventional procedures on the usual tire building machinery and cured under pressure in suitable molds at from about 280 to 310° F. for from about 15 to 60 minutes or more. The various plies, tread stock and so forth can be tackified with heptane or similar solvents, or with adhesives of a polymer of this invention as a 15% solids in a solvent such as heptane, at the time they are laid up on the building drum. Cushion stock and inserts can be added during tire building between the breaker, if used, and the various plies as necessary to improve riding and wearing qualities as well as to obtain the desired contour and cross section in the finished tire. Chafer strips, also, can be added during the building operation in the vicinity of the beads to minimze chafing caused by contact with the rim. All of the rubbery material employed in making the tire can be of one or more of the polymers or copolymers of the present invention. Moreover, the tread, sidewalls, and ply stocks can be of the same or a different polymer (in which the monomers or proportions thereof are varied) of the present invention depending upon the properties required in the particular structure involved. Various curing systems can be used with these compositions to get the desired degree of curing in the final tire.

Where the carcass or one or more of the ply stocks, sidewalls and the like are made of a rubbery material other than that of the present invention such as a rubbery copolymer of butadiene-1,3 and styrene, natural rubber, cis-polyisoprene, cis-polybutadiene-1,3 and so forth as well as blends thereof including those with reclaim rubber, adhesives or cements containing those rubbers with varying amounts of the rubbery polymers or copolymers of this invention can be used if necessary to obtain the desired adhesion between the other rubbery compositions and the rubbery copolymers of the present invention. For example, where it is desired to join an extruded tread and sidewall stock of a composition of a rubbery polymer of this invention, for example a rubbery polymer of propylene oxide (PO) or a rubbery copolymer of propylene oxide and allyl glycidyl ether (AGE), to a carcass of a rubbery butadiene-1,3/styrene (BDN-STY) copolymer stock, a layer of a cement of a major amount of the BDN-STY copolymer and a minor amount of the PO- AGE copolymer is brushed on the outer surface of the carcass and dried. Next, a cement layer of about equal portions of the BDN-STY copolymer and the PO-AGE copolymer is applied to the first layer and dried followed by a third layer of a minor amount of BDN-STY copolymer and a major amount of the PO-AGE copolymer and dried. This last layer is designed to be in contact with the tread and sidewall when assembled. The carcass having the three layers of cement is then ready for application of the sidewalls and tread. After final assembly and curing, the tread and sidewalls adhere to the carcass. Where the tread, sidewalls, ply stocks and others are made of blends of the polymers of the present invention and natural rubber, rubbery butadiene-1,3/styrene copolymers etc., one or more similar cement layers can be used if desired.

The catalyst is most usefully prepared by reacting a transition metal cyanide complex with a metal salt in aqueous media. Removal of a substantial amount or all of the water present in the catalyst is very desirable to enhance the activity of the catalyst although it would appear that removal of all the water is not practicable and may not be desirable. One way to remove most of the water and to enhance even further the activity of the catalyst is to treat it with an additional complexing or coordinating material such as an alcohol, ether, ester, sulfide, ketone, aldehyde, amide and/or nitrile.

In general the catalysts employed in the present invention have the following rational formulae:

$$M_a[M'(CN)_b]_c$$

or/and $$M_a[M'[(CN)_r(X)_t]_b]_c$$

M is a metal ion that forms a metal-oxygen bond that is relatively more stable than the coordinate bond between the metal and the nitrogen atom of the cyano, CN, group. On the other hand, M' is a transition metal ion that has more than one stable valence form and forms a relatively strong covalent bond with the carbon atom of the CN group. An individual catalyst can contain more than one type of M or M' metal ion in its structure. The grouping of these metals, with the cyanide ion sharing electrons with the two metal ions, usually exists in polymeric form as follows:

$$(-M'-CN\ldots M \ldots NC-M'-)_n$$

where $n$ is a number, and super 3-dimensional polymers can be formed depending on the coordination numbers of M and M'. Moreover, of those metal ions that produce active cyanide catalysts, all can coordinate with six groups. Most of the hexacyanoferrates (III), including zinc hexacyanoferrate (III), have a cubic face-centered lattice as the basic structure.

The CN⁻ group in the catalyst is the bridging group, and can constitute all of the bridging groups in the catalyst. However, other bridging groups can be present in the catalyst so long as the catalyst contains at least a majority of CN⁻ bridging groups. Thus, $r$ and $t$ are numbers and $r$ is greater than $t$. $t$ is zero when only the CN group is the bridging group. Other bridging groups, X in the right hand formula above, which can be present with the CN⁻ group, can be F⁻, Cl⁻, Br⁻, I⁻, OH⁻, NO, O²⁻, CO, H₂O, NO₂⁻, C₂O₄²⁻ or other acid radical, SO₄²⁻, CNO⁻ (cyanate), CNS⁻ (thiocyanate), NCO⁻ (isocyanate) and NCS⁻ (isothiocyanate) and so forth.

In the above formulae M is preferably a metal selected from the group consisting of Zn(II), Fe(II), Fe(III), Co(II), Ni(II), Mo(IV), Mo(VI), Al(III), V(IV), V(V), Sr(II), W(IV), W(VI), Mn(II) and Cr(III). On the other hand, M' is preferably a metal selected from the group consisting of Fe(II), Fe(III), Co(II), Co(III), Cr(II), Cr(III), Mn(II), Mn(III), V(IV) and V(V). Also, $a$, $b$ and $c$ are numbers whose values are functions of the valences and coordination numbers of M and M', and the total net positive charge on M times $a$ should be equal essentially to the total net negative charge on $[M'(CN)_b]$ or $[M'[(CN)_r(X)_t]_b]$ times $c$. In most instances $b$ corresponds to the coordination number of M' and is usually 6.

Examples of catalysts which fall within the above description and which may be used are zinc hexacyanoferrate(III), zinc hexacyanoferrate(II), nickel(II) hexacyanoferrate(II), nickel(II) hexacyanoferrate(III), zinc hexacyanoferrate(III) hydrate, cobalt(II) hexacyanoferrate(II), nickel(II) hexacyanoferrate(III) hydrate, ferrous hexacyanoferrate(III), cobalt(II) hexacyano cobaltate(III), zinc hexacyano cobaltate(II), zinc hexacyanomanganate(II), zinc hexacyano chromate(III), zinc iodo pentacyanoferrate(III), cobalt (II) chloropentacyanoferrate(II), cobalt(II) bromopentacyanoferrate(II), iron(II) fluoropentacyanoferrate (III), zinc chlorobromotetracyanoferrate(III), iron(III) hexacyanoferrate(III), aluminum dichlorotetracyanoferate(III), molybdenum(IV) bromopentacyanoferrate (III), molybdenum(VI), chloropentacyanoferrate(II), vanadium(IV) hexacyanochromate(II), vanadium(V) hexacyanoferrate(III), strontium(II) hexacyano manganate(III), tungsten(IV) hexacyano vanadate(IV), aluminum chloropentacyano vanadate(V), tungsten(VI) hexacyanoferrate(III), manganese(II) hexacyanoferrate (II), chromium(III), hexacyanoferrate(III), and so forth. Still other cyanide complexes can be used such as $$Zn[Fe(CN)_5NO]$$
$$Zn_3[Fe(CN)_5NO_2]_2$$
$$Zn[Fe(CN)_5CO]$$
$$Zn[Fe(CN)_5H_2O]$$
$$Fe[Fe(CN)_5OH]$$
$$Cr[Fe(CN)_5NCO]$$
$$Cr[Fe(CN)_5NCS]$$
$$Al[Co(CN)_5CNO]$$
$$Ni_3[Mn(CN)_5CNS]_2$$

and the like. Mixtures of these compounds can be employed.

In general, the complex catalysts of this invention are prepared by reacting aqueous solutions of salts which give a precipitate of a metal salt of a transition metal complex anion. For example, $$M_aZ + M''[M'(Y)_b]_c \rightarrow M_a[M'(Y)_b]_c + M''Z$$

where M is a metal ion which precipitates complex anion salts e.g., Zn⁺⁺. $a$, $b$ and $c$ in this equation are numbers but are not necessarily equal on both sides of the equation since their values, again, are functions of the valences and coordination numbers of M, M' and M'' and possibly Y and Z. Z is a halide or other anion e.g. Cl⁻; M'' is a hydrogen ion or a metal ion whose complex anion salts are soluble in water or other solvent e.g., K⁺ or Ca⁺⁺; M' is a complexing transition metal ion, e.g. Fe⁺⁺⁺; and Y is a complexing anion, e.g. CN⁻. Excess $M_aZ$ may be used.

Little if any of the other bridging groups or ligands which can be used to replace part of the cyano groups (CN⁻) are usually introduced into the complex by use of the salt $M_aZ$. Rather, they are introduced into the complex by employing the $M''[M'(Y)_b]_c$ salt containing the ligand or more correctly a salt having the formula $M''[M'((CN)_r(X)_t)_b]_c$ in which $t$ is a number dependent on the valence of M'' and the other symbols used are the same as identified above. For example, instead of potassium ferricyanide, K₃Fe(CN)₆, there are used $$K_2(Fe(CN)_5NO)$$
$$K_3(Fe(CN)_5NO_2)$$
$$K_2(Fe(CN)_5CO)$$
$$K_2(Fe(CN)_5H_2O)$$
$$K_3(Fe(CN)_5Cl)$$
$$K_3(Fe(CN)_4BrF)$$
$$K_3Co(CN)_5I$$
$$K_3(Co(CN)_5OH)$$
$$Na_3(Co(CN)_5CNO)$$
$$Na_3(Co(CN)_4(CNS)_2)$$
$$Ca_3(Fe(CN)_5NCO)_2$$
$$K_3(Mn(CN)_5NCS)$$

and so forth. Examples of the preparation of such starting materials are:

(I) $K_3Fe(CN)_6 + Cl_2 \rightarrow K_3Fe(CN)_5Cl + CNCl$ and (II) $K_3Fe(CN)_5Cl + H_2O \rightarrow K_2Fe(CN)_5H_2O + KCl$ They, also, may be prepared by boiling a material such as $K_3Fe(CN)_6$ in aqueous KCl, oxalic acid or other salt and so forth. Still other methods can be used. For example, see "Cyanogen Compounds," Williams, 2nd ed., 1948, Edward Arnold and Co., London, p. 252 and elsewhere.

The salts should be reacted in substantial concentration in aqueous media at room temperature and, also, preferably in air or under atmospheric pressure. However, heat can be used and the catalyst can be prepared under conditions substantially or entirely free of oxygen. The salts which are used are the chloride, fluoride, bromide, iodide, oxynitrate, nitrate, sulfate or carboxylic acid salt, such as the acetate, formate, propionate, glycolate and the like salt of a M element of the group as defined above or other M salts and mixtures thereof. Preferred are the M halide salts or halide salt forming materials since they provide catalysts having the best activity. An excess of the M salt is usually reacted with a Na, K, Li, Ca etc. M' cyanide compound and so forth. Mixtures of these salts can be used.

If the resulting precipitate is then just filtered or otherwise separated from the water, preferably by using a centrifuge and dried without further washing, it has been found that the precipitated complex is non-catalytic, that is, it fails to polymerize the organic oxides in any practical amount.

Apparently extraneous ions in the solution used to form the precipitate are easily occluded with the complex. Anions (Cl⁻ etc.) coordinate to the positively charged metallic ions in the lattice, and cations (K⁺) coordinate to the negatively charged nitrogen atoms of the cyanide bridging groups. These ions, especially those anions coordinating to or associated with the M atom, inhibit catalytic activity or prevent the complex from causing appreciable polymerization. Additionally, these ions, for example easily ionizable Cl, may terminate the polymer chain.

On the other hand, if the complex is treated or washed one or more times with water, some or a substantial number of these occluded ions are removed from the precipitate or from the surface of the crystal lattice and the complex becomes an active catalyst for the polymerization of organic cyclic oxides. It is desired to remove all or a substantial amount of these occluded ions to enhance as much as possible the catalytic activity of the complex. However, from a practical standpoint it may not be possible to remove all of them due to the steps and times required. Moreover, some of these ions are probably trapped in the crystal lattice and cannot be removed easily. However, their presence should be reduced as much as possible. After the water wash the complex will have an appreciable amount of water depending on the number of washings and the degree of drying following water washing. These resulting catalysts will then have the following rational formulae:

$$M_a[M'(CN)_b]_c \cdot (H_2O)_d$$

or/and $$M_a[M'[(CN)_r(X)_t]_b]_c \cdot (H_2O)_d$$

where $d$ is a number and where M, M', CN, X, $a$, $b$, $c$, $r$ and $t$ have the significance as defined supra. If the catalyst is dried or gently heated for extended periods of time $d$ can be or approach zero.

Moreover, to obtain the best activity of the catalysts for polymerization, an organic material is added to the catalyst precipitate preferably before it is centrifuged or filtered, is mixed with the water during washing of the precipitate, is used alone as the washing medium provided it replaces or dissolves the occluded ions, or is used to treat or wash the precipitate after it has been washed with water to replace at least a portion of the water. Sufficient of such organic material is used to effect these results in order to activate and/or enhance the activity of the catalyst. Such organic material, also, should desirably coordinate with the M element or ion and should desirably be one or more relatively low molecular weight organic materials. The organic material should preferably be water miscible or soluble or substantially so, have a substantially straight chain or be free of bulky groups and have up to 18 carbon atoms, even more preferably only up to 10 carbon atoms, and be a liquid at room temperature.

Examples of organic materials for use in treating the double metal cyanide catalyst to afford polymers of inherent viscosities in isopropanol of up to about 2.5 are alcohols, aldehydes and ketones such as methanol, ethanol, propanol, isopropanol, butanol, hexanol, octanol, and t-butyl alcohol; formaldehyde, acetaldehyde, propionaldehyde, butyraldehyde, i-butyraldehyde, glyoxal, benzaldehyde and tolualdehyde; and acetone, methyl ethyl ketone, 3 - pentanone, 2 - pentanone, and 2 - hexanone. Ethers such as organic cyclic polyethers are also useful affording generally polymers of intrinsic viscosities up to about 3.6. Examples of such cyclic ethers are m-dioxane, p-dioxane, trioxymethylene, paraldehyde and so forth. Aliphatic saturated monoethers are also useful. Acyclic aliphatic polyethers are preferred since catalysts treated with them afford polymers having intrinsic viscosities of from about 4 to about 7. Examples of such ethers, such as aliphatic ethers, are ethyl ether, 1-ethoxy pentane, bis- (b - chloroethyl) ether, bis - (b - ethoxy ethyl) ether or diglyet, butyl ether, ethyl propyl ether, bis-(b-methoxy ethyl) ether or diglyme, ethylene glycol dimethyl ether, triethylene glycol dimethyl ether, dimethoxy methane, acetal, methyl propylether, diethoxymethane, octaethylene glycol dimethyl ether and so forth of which the acyclic polyethers are preferred. Still other organic complexing agents can be used such as the amides, esters, nitriles and sulfides of which the following are examples: formamide, acetamide, propionamide, butyramide, and valeramide; amyl formate, ethyl formate, n-hexyl formate, n-propyl formate, ethyl ethanoate, methyl acetate, ethyl acetate, methyl propionate, and triethylene glycol diacetate; acetonitrile, propionitrile and butyronitrile; and dimethyl sulfide, diethyl sulfide, dibutyl sulfide, dipropyl sulfide, and diamyl sulfide and so forth. Preferred are ethers having more than one oxygen atom and which form a chelate bond with respect to M. Mixtures of these organic treating agents can be used. Excess of these organic treating agents which are not complexed with the catalyst, especially the high boiling compounds, can be removed by extraction with pentane, hexane and so forth.

After treatment with the above organic material the catalysts have the following rational formulae:

$$M_a[M'(CN)_b]_c \cdot (H_2O)_d \cdot (R)_e$$

or/and $$M_a[M'[(CN)_r(X)_t]_b]_c \cdot (H_2O)_d \cdot (R)_e$$

In these formulae $d$ can be a number, fractional number, or zero and $e$ is a number which, since the catalyst is a nonstoichiometric complex in which various amounts of $H_2O$ and R may be bonded to the various M's, may be a fractional number rather than an integer. $e$ is zero when the complex is not treated with R. R is one or more of the complexing organic amides, alcohols, aldehydes, esters, ethers and so forth shown above. M, M', CN, X, $a$, $b$, $c$, $r$ and $t$ have the significance as discussed above. In general, $d$ and $e$ will have values corresponding at least in part to the coordination number of M. However, both the $H_2O$ and R can be occluded in the crystal lattice. In general the sum of the oxygen, nitrogen and/or sulfur or other coordinating atoms of $H_2O$ and R (depending on the organic complexing agent) is equal to from about 0.1 up to about 5.0 g-atoms maximum per g-atom of M. Subsequent drying or heating of the catalyst to remove all of the $H_2O$ and/or R results in a loss or a substantial decrease in the catalytic activity of the catalyst.

As shown by the previous formulae if the organic complexing material is not used, R will not be present, and hence, $e$ can be zero. Thus, the general formula for these catalysts is $M_a(K)_c \cdot (H_2O)_d \cdot (R)_e$ where M, $H_2O$, R, $a$, $c$, $d$, and $e$ have the significance as indicated above, where $d$ and $e$ also can be or approach zero, where K is selected from the group consisting of $M'(CN)_b$ and

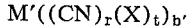

and where M′, CN, X, $b$, $r$ and $t$ have the significance as indicated above. With regard to the subscripts in the above formulae, number includes whole numbers as well as fractional numbers.

It is to be noted that if the catalyst is merely filtered or centrifuged from the solution in which it was prepared and washed with one of the polymerizable cyclic oxide monomers, it shows little or no catalytic activity for subsequent polymerization of said monomers. On the other hand, if the catalyst is washed with water and the ether, or the ether or other organic complexing compound as described above, and subsequently with one of the polymerizable cyclic oxide monomers a storable initiator for polymerization is obtained.

After the washing steps the precipitate or catalyst can be used as such. However, it is preferred to dry it to remove excess treating agent and any remaining easily removable $H_2O$ and to provide it in a form which is easily handled. Such drying is readily accomplished by subjecting the catalyst to a vacuum or by heating it in air or in an inert atmosphere at a temperature up to about 100° C. It is much preferred to dry under a vacuum (for example 0.5–1 mm. Hg) at low temperature, for example about room temperature (25° C.) or in a stream of air, nitrogen or inert gas at 25° C. or at least at a temperature above about 5° C. The heat-treated catalyst has generally to be used at higher concentrations than the vacuum-treated catalyst. As the temperature during drying is increased, the activity of the catalyst for polymerization is decreased. Thus, high temperatures are to be avoided. 200° C. may be considered as a maximum temperature. During heat treatment it is believed that some of the oxygenated and other organic treating compounds weakly coordinated to M may be lost to leave voids in the crystal lattice, and the atoms in the crystal lattice may rearrange to satisfy the coordination requirements of the metals. Heating may also remove $CN^-$ as $(CN)_2$ and reduce M′. Also, the molecular weight of the catalyst can increase, and the number of "exposed" metal ions on the surface of the catalyst or the active sites can be reduced, thus reducing the activity of the catalyst for epoxide and oxetane polymerization. It, thus, is preferred that the drying step leave as many as possible M ions exposed in the lattice of the complex and that the catalyst be in finely divided or particulate form to obtain the best results for polymerization. Moreover, freshly prepared (precipitated, washed and dried) catalysts are preferred rather than catalysts which have been aged or stored for extended periods of time since the catalysts decompose slowly when stored. The catalyst can be stored for longer times at lower temperatures.

The organic cyclic oxides to be polymerized include any cyclic oxide having an oxygen-carbon ring in which an oxygen atom is joined to 2 or 3 carbon atoms in the ring which will open and polymerize with the same or other cyclic oxide monomers and having up to a total of 70 carbon atoms or more. These monomers, also, may contain 1, 2 or more, preferably only 1, aliphatic carbon-to-carbon double bonds. The alkenyl, nitro, ether, ester and halogen (except easily ionizable halogen substituted derivatives) substituted derivatives of these cyclic oxides can likewise be employed. The use of monomer mixtures having cyclic oxide monomer(s) containing aliphatic carbon-to-carbon double bond unsaturation in minor amounts, the balance being the saturated cyclic oxide monomer(s), permits the resulting copolymer to be cured readily with materials such as sulfur and the like. A very useful mixture is one containing propylene and/or 1,2-butylene oxide or other saturated oxide in an amount of from about 80 to 99.5 mol percent and allyl glycidyl ether, vinyl cyclohexene monoxide and/or butadiene monoxide or other unsaturated oxide in an amount of from 20 to 0.5 mol percent to obtain a crosslinkable (by sulfur) copolymer. Minor amounts, about 0.5–20 mol percent, of a third, fourth or fifth etc. monomer, replacing part of the propylene oxide and/or allyl glycidyl ether etc. such as 1,2-butene oxide, 2,3-hexene oxide etc. of from 4 to 12 carbon atoms, can be used in making the copolymer to break the lengths of isotactic units in the copolymer which are too short to be measured by X-ray. This may be desirable, where only small amounts of an unsaturated monomer are used, to obtain more flexibility in processing and molding. These cyclic oxides should be pure or essentially pure to obtain the best results or they should be free or essentially free of materials like $H_2O$ which may inhibit polymerization.

Examples of useful cyclic oxides are ethylene oxide (1,2-epoxy ethane), propylene oxide, 1,2-butene oxide (or 1,2-epoxy butene), 2,3-butene oxide, 1,2-dodecane monoxide, isobutylene monoxide, styrene oxide, 1,2-pentene oxide, isopentene oxide, 1,2-diisobutylene oxide, 1,2-hexene oxide, 2,3-hexene oxide, 1,2-heptene oxide, allyl glycidyl ether, isoheptene oxide, octene oxide, nonene oxide, decene oxide, hendecene oxide, methyl glycidyl ether, ethyl glycidyl ether, vinyl cyclohexene monoxide, nitro ethylene oxide, phenyl glycidyl ether, 3-methyl-3,4-epoxy butene-1, butadiene monoxide, glycidyl methacrylate, 2,3-diisobutylene oxide, dicyclopentadiene monoxide, isoprene monoxide, oxetane ($C_3H_6O$), tolyl glycidyl ether, 3,3-dimethyl oxetane, 3-n-nonyl oxetane, 3-allyl-3-methyl oxetane, 3-vinyl-3-methyl oxetane, pentadecene oxide, 3,3-diethyl oxetane, 3-ethyl-3-butyl oxetane, 3-chloro-methylene oxetane, 3-chloro methyl-3-methyl oxetane, 3-methyl-3-ethyl oxetane, 1,2-epoxy pentacosane, 1,4-dichloro-2,3-epoxy butane, allyl epoxy stearate, 1,2-hexacontene oxide, 1,2-heptacontene oxide and other cyclic oxides. These cyclic oxides should preferably have a total of from 2 to 25 carbon atoms. Of these materials it is even more preferred to use the lower molecular weight cyclic oxides such as ethylene oxide, propylene oxide, butylene oxide, etc. containing from 2 to 12 carbon atoms with minor amounts of unsaturated cyclic oxides, such as allyl glycidyl ether, butadiene monoxide and vinyl cyclohexene monoxide, etc. containing up to 12 carbon atoms. Mixtures of 2, 3, 4, 5 or more of these cyclic oxides can be used for polymerization.

One or more of the above cyclic oxides can be reacted with one or more cyclic oxides having 2, 3 or more rings of from 2 to 3 carbon atoms and 1 oxygen atom, preferably in a minor molar amount. Examples of these cyclic oxides (i.e., di, tri, etc. epoxides and/or oxetanes) are: butadiene dioxide, vinyl cyclohexene dioxide, limonene dioxide, the diglycidyl ether of bisphenol A, the diglycidyl ether of pentanediol, the reaction product of the diglycidyl ether of pentanediol and bisphenol A, the reaction product of the diglycidyl ether of pentanediol and a polyalkylene and/or arylene ether glycol, (3,4-epoxy-6-methyl cyclohexyl methyl)-3,4-epoxy-6-methyl cyclohexane carboxylate, 1-epoxyethyl-3,4-epoxy cyclohexane, diglycidyl ether, bis(3-oxetane)butane, bis(3-oxetane)hexane, dipentane dioxide, the reaction product of epichlorohydrin and trihydroxyl diphenyl dimethyl methane, the reaction product of epichlorohydrin and phloroglucinol, the reaction product of epichlorohydrin and erythritol, the reaction product of 3-chloro oxetane and bisphenol A, the reaction product of 3-chloro oxetane and trihydroxyl diphenyl dimethyl methane, the reaction product of 3-chloro oxetane and hexanetriol-1, 2, 6 or pentaerythritol, and the like and mixtures thereof.

Alkylene oxides or epoxides are well known. They can be prepared by the reaction of alkenes such as propylene, ethylene, 2-butene, butadiene-1,3, divinyl benzene etc. with perbenzoic acid, peracetic acid and so forth in an inert solvent at low temperatures followed by distillation or other separation. Other methods can be used such as shown in the "Journal of the American Chemical Society," 78, 4787 (1956). Also

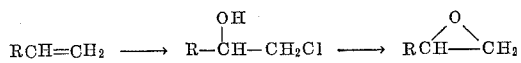

Oxetanes also are well known. They can be made by the preparation of an NaOH solution of a 1,3-glycol which is then dripped into sulfuric acid to close the ring and split out water. An alternative method is as follows:

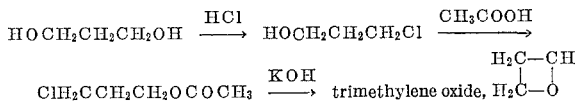

Another method is to heat a dialdehyde in the presence of acetaldehyde and aluminum isopropoxide; distill off the acetone to get the aluminum salt; hydrolyze to remove the aluminum to obtain

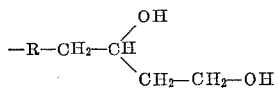

and then add this compound to an NaOH solution and drip the solution into sulfuric acid to obtain ring closure and the splitting out of $H_2O$.

The catalyst is used in a minor amount by weight only sufficient to catalyze the reaction. Large amounts are usually wasteful and may in time cause reversion or subsequent decomposition of the polymer. In general, there is used a total of from about 0.001 to 10% by weight of the catalyst based on the total weight of the polymerizable cyclic oxide monomer or monomers employed during polymerization. However, it is preferred to use from about 0.01 to 0.50% by weight of the catalyst based on the total weight of the monomer(s).

The monomers may be polymerized with the catalyst in mass, or in solvent (which can facilitate handling and transfer of heat). They, also, should be polymerized under inert and/or non-oxidizing conditions, for example, under an atmosphere of nitrogen, argon, neon, helium, krypton or other inert atmosphere. Alternatively, the inert gas can be omitted and the monomer polymerized only under pressure from any vaporized solvent if used or vaporized monomer. In some instances the polymerization can be conducted in polymerizers open to the air provided the air is free of materials which would inhibit polymerization (i.e., conversion or molecular weight) and especially free of $H_2O$, although this procedure can be hazardous for some of the monomers are flammable. The monomer should be soluble in the solvent which should be an inert or non-reactive solvent. Examples of useful solvents are heptane, octane, cyclohexane, toluene, benzene, trimethylpentane, n-hexyl chloride, n-octyl chloride, carbon tetrachloride, chloroform, trichloroethylene etc. Since many of the reactants are volatile the polymerization should be conducted in a closed container and may be under pressure. The reactor is preferably operated at a total pressure of 1 atmosphere or somewhat less. Polymerization can be conducted at temperatures of from about 0° C. to 100° C. although somewhat wider temperature ranges can be used. Preferably temperatures of from about 15° C. to 35° C. are used for polymerization. An induction period of about ¼–2 hours or more may be observed with some of the catalysts. If the polymer dissolves in the solvent, it can be precipitated with a non-solvent and recovered, or the solvent can be separated from the polymer by distillation or evaporation. The catalyst or catalyst residues can be removed if desired by dissolving the polymer in a solvent, adding dilute aqueous KOH and then reprecipitating or by treating a solution of the polymer with $H_2O$ or $NH_4OH$ and centrifuging. The necessity of removal of the catalyst will depend upon the ultimate use of the polymer. It is very desirable to polymerize while agitating the monomer(s), catalyst and solvent, if used.

Since the reaction is exothermic and since some monomers may polymerize very rapidly in the presence of the catalyst, it may be desirable to reduce the concentration of the catalyst or to use a solvent as above as diluent.

Gel formation during polymerization with unsaturated monomers is not usually observed using the double metal cyanide catalysts, and consequently gel inhibitors are not normally required. Antioxidants or antidegradants such as phenyl beta naphthylamine, PBNA, or other antidegradants are desirably added prior to or after polymerization to avoid degradation which might occur in the presence of these catalysts which may catalyze oxidation. PBNA may be used in an amount by weight approximately equal to the amount of the catalyst during polymerization. Some antidegradants may retard polymerization and should be added after polymerization.

The polymers and copolymers etc. obtained by the method of the present invention have an average molecular weight of at least 20,000. Most of them have a high average molecular weight of from about 500,000 to 1,000,000 or higher, as shown by their high viscosities. As an indication of the amorphous nature of most of these polymers a rubbery copolymer of about 97 mol percent propylene oxide and 3 mol percent allyl glycidyl either is relatively soft and gives low tensile values (about 350 p.s.i.) when cured as a gum stock. When loaded with 40 p.p.h. of HAF black, tensile strengths of up to 2300 p.s.i. are observed. X-ray diffraction of the black loaded cured stock when stretched showed a low degree of crystallinity.

The resinous and rubbery polymers of this invention are useful as coatings or impregnants for fabrics, films for packaging materials, belts, elastic fibers, adhesives, hose or tubing, and in making tires, shoe heels, raincoats, rubbery laminates, upholstery materials, floor mats and tiles, carpet and rug backings, gaskets, molded articles, golf ball covers, centers and cores, sponges or other cellular products, encapsulating compounds and the like. Low molecular weight solid or grease-like polymers of this invention are useful as plasticizers and extenders for natural and synthetic resins and rubbers as well as for the high molecular weight polymers of the present invention.

The polymers may be compounded or mixed with the usual rubber and resinous compounding materials such as curing agents, anti-degradants, fillers, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, zinc stearate, sulfur, organic peroxides, 2-mercapto-benzothiazole, bis-(morpholyl) disulfide, bis(benzothiazyl) disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta naphthylamine, pine oil, mineral oil, hydroquinone monobenzyl ether, mixtures of octylated diphenyl-amines, styrenated phenols, aldol alpha naphthylamine, diphenyl amine acetone reaction products, antimony oxide, asphalt, coumarone indene resin, natural rubber polyisoprene, butadiene-styrene rubber or resin, polyethylene-propylene rubbers, a 60/30/10 ethylene-propylene-butadiene terpolymer, nitrile rubber, poly-butadiene, acrylonitrile-styrene resin, polyesters, polyethers, polyester and/or ether urethanes, polyvinyl chloride and the like and mixtures thereof. Polymers of the present invention may be cured by sulfur and the like or sulfur furnishing materials, organic peroxides, other curing and crosslinking materials, irradiation and so forth.

It is not precisely known what occurs to make the double metal cyanide complexes, especially those treated with the above organic complexing materials (ether, etc.), so useful in polymerizing organic cyclic oxides. While the following discussion relates to treatment of the double metal cyanide catalyst with ethers, it will be appreciated that it will generally also apply to treatment of such catalyst with the other organic treating agents shown above. It has been shown that, for example, with respect to zinc hexacyanoferrate, as an illustration, when the precipitate is washed with dioxane, a more effective catalyst is produced. During this treatment with dioxane it is believed that a number of reactions takes place: (1) some of the chloride ions in the lattice are oxidized, resulting in the reduction of Fe(III) to Fe(II); (2) the chlorine from reaction (1) reacts with the water and ether present during the wash-treatment to give Cl−, and chlorinated ether; (3) the successive washes remove some of the products of reaction (2); and (4), the oxygen atoms of the ether apparently coordinate to the zinc ions in the lattice, rearranging the lattice structure by inserting dioxane groups between the zinc ions as follows:

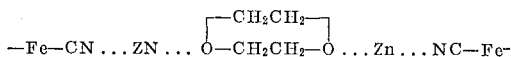

Thus, in the case of some of the dioxane-zinc hexacyanoferrate complexes, elemental analyses revealed that they were apparently nonstoichiometric complexes having the formula $Zn_3[Fe(CN)_6]_2 \cdot (C_4H_8O_2)_x \cdot (H_2O)_y$, where $y=1$ to 2 and $x=2.5$ to 3.1. According to infrared and elemental analyses some of the dioxane in the complex may be chlorinated and some of the $H_2O$ may be in the form of —OH, or —O— groups. As ordinarily prepared, these complexes generally contained from about 4 to 5% Cl− and a smaller amount of K+.

If the catalyst is prepared with $Zn(NO_3)_2$ instead of $ZnCl_2$, approximately 50% of the normal amount of dioxane is incorporated in the catalyst. This catalyst is not as effective as the one prepared from the chloride as shown by Example 2I below.

Although a great part of the iron in the ether (or other organic complexing moiety)-zinc hexacyanoferrate complex is believed to be Fe(II), as a result of the oxidation-reduction reaction that occurs during preparation, the dioxane complex prepared from $ZnCl_2$ and $K_4Fe(CN)_6$ is not as active even at polymerization temperatures of 80° C. Analyses showed that a reduced amount of dioxane was incorporated in such complexes and the chlorine content was high.

The reduced catalytic effect when using $Zn(NO_3)_2$ or $K_4Fe(CN)_6$ in the preparation of the catalyst complex is apparently related to the mechanism of the ether-hexacyanoferrate reaction. This mechanism may be viewed as follows. As the chloride ions of the surface zinc ions in the crystal lattice transfer electrons into the Zn . . . NC–Fe grouping, ether molecules can displace the resulting chlorine atoms and form ether-zinc coordinate bonds. For example, $Zn_3[Fe(CN)_6]_2(KCl)_y + yROR \rightarrow$
$\quad Zn_3K_y[Fe(CN)_6]_2(ROR)_y + yCl°$ (Note: y in the above equation may not be same as in the preceding formulae.)

The driving force for this reaction is the removal of $Cl_2$ by solution of the gas in the water and ether and the reaction of $Cl_2$ with the ether.

This oxidation-reduction reaction and displacement of the chlorine by ether is accompanied by a change in the crystal lattice. According to elemental and infrared analyses, most of the zinc ions in the lattice appear to form coordination bonds with from 1 to 4 oxygen atoms. The oxygen atoms of both the water and the ether are involved in this coordination. X-ray analysis and density measurements appeared to confirm this lattice change. Thus, the oxygen atoms of the ether compete with the CN groups of the $Fe(CN)_6$ anion to produce a polymeric structure with more exposed zinc ions as shown below:

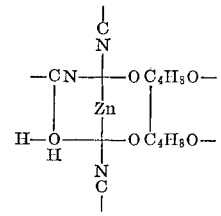

This process of "opening up" the lattice is aided by the presence of water during the ether treatment. Apparently, the water dissolves $Fe(CN)_6$ anion sections in the lattice that are coordinated to K+ ions, and more of the lattice becomes exposed to the ether during the hexacyanoferrate-ether reaction.

Moreover, it appears from experiments that water acts as a chain-transfer agent in organic oxide polymerization with these catalysts. Therefore, the best catalyst for producing a polymer of high molecular weight is preferably one containing the least amount of water. One technique for removing water from the lattice structure is to displace the water with ether and remove the former by azeotropic distillation as shown by Example 2B below. The distillation is best carried out under vacuum at room temperature or thereabouts, i.e. 5 to 40° C., in order to prevent decomposition of the complex which may occur at elevated temperatures as discussed supra. In any event temperatures should not go above 100 or 200° C. as discussed supra or below about 5° C. Hexane or other relatively low-boiling, inert, and essentially water-insoluble solvents such as heptane, toluene, benzene, pentane, 2-chlorobutane, cyclohexane, cyclopentane, ethylene chloride, and butane can be used in this distillation to separate the water from the ether as the distillate collects in a trap. In this way, all displaceable water is removed, however some water invariably remains trapped in the lattice. Other methods can be used to remove the water.

Also experiments indicate that chloride ions can inhibit the polymerization reaction (compare Examples 2B and C, and 6A and B below). Several methods for reducing the ionizable chlorine or other ionizable anions in the catalysts can be used. For example, in one method the catalyst is washed with a solution containing ether and water and the soluble chloride salt is removed. In another method the zinc hexacyanoferrate is prepared by reacting compounds such as $Ca_3[Fe(CN)_6]_2$, $AlFe(CN)_6$, or $Li_3Fe(CN)_6$ with $ZnCl_2$. The corresponding halide that forms and occludes on the crystals of $$Zn_3[Fe(CN)_6]_2$$

is then removed by the ether during the washing operation. When the preparations are made with $K_3Fe(CN)_6$, ether-insoluble KCl is produced. However, when zinc hexacyanoferrate is prepared by the second method above, ether (organic treating agent) soluble $CaCl_2$, $AlCl_3$, or $LiCl$ is produced. Also, where ions such as Cl− are covalently bound to the complex, they do not apparently adversely affect polymerization of the epoxides and oxetanes. In fact, the organic complexing materials like the chlorinated ethers can improve the efficiency of the catalyst, because the halogenated ethers can be displaced more readily by the epoxides and oxetanes to start polymerization than the non-halogenated ethers.

When the catalyst is treated with polyethylene glycol ethers, a very active catalyst is obtained. They apparently form a chelate bond to the zinc ion. The formation of a chelate complex increases the driving force of the hexacyanoferrate-ether reaction and makes for a very open lattice because polymeric coordination through the oxygen atom is prevented. The coordination of $$Zn_3[Fe(CN)_6]_2$$

with diglyme (dimethyl ether of diethylene glycol) is shown below:

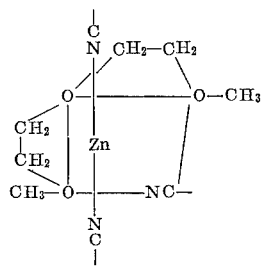

The use of diglyme and diglyet (dimethyl and diethyl ethers, respectively, of diethylene glycol) in the usual catalyst preparation was found to increase the efficiency of the catalyst from 500 g. polymer/g. catalyst to 850 g. polymer/g. catalyst.

Moreover, the addition of a substantial amount, such as 30–70% by volume of the total fluid, of the ether (or other organic treating agent) to freshly precipitated hexacyanoferrate in water greatly enhanced the activity of the catalyst, more than doubled amount of polymer per unit weight of the catalyst (see Example 6C below): the efficiency increases to 2000 g. polymer/g. catalyst. This catalyst also produces a polymer of very high molecular weight. According to elemental analysis, this complex may have some (ZnCl)+ ions in its structure.

It, thus, would appear that the best catalysts for oxide polymerization are those that contain the greatest amount of Zn—O ether bonds, rather than Zn—OH$_2$O bonds, and the least amount of ionizable chlorine. The more active catalysts, also, are prepared by using an excess of zinc chloride, and adding the K$_3$Fe(CN)$_6$ solution to the chloride. Accordingly, it is seen that the present invention provides a novel way for polymerizing cyclic oxides and methods for enhancing the activity of the catalysts to obtain higher molecular weights, greater catalyst efficiency and so forth.

The following examples will serve to illustrate the present invention with more particularity to those skilled in the art:

*Example 1.—Relatively pure zinc hexacyanoferrate (III) as catalyst*

K$_3$Fe(CN)$_6$ (37.6 g., 0.114 mole) dissolved in 400 ml. water was added dropwise to a stirred solution containing ZnCl$_2$ (77.2 g., 0.566 mole) in 150 ml. water. This is equivalent to using a 3.3-fold excess of ZnCl$_2$. The precipitated zinc hexacyanoferrate was thoroughly washed with hot (85°–95° C.) water and dried at 80° C. at <1 mm. Hg to give Zn$_3$[Fe(CN)$_6$]$_2$·1.6 H$_2$O with 0.2% Cl. Infrared analysis showed that 24% of the iron in the complex was reduced to Fe(II). This catalyst complex was then used to copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 80 | 24 | 0.2 | 0.2 | 3.0 | 1.9 | 40 | 1.6 |

If zinc hexacyanoferrate was prepared by combining 15–20% (wt.) aqueous solutions of zinc chloride and potassium hexacyanoferrate (III), the resulting precipitate, after drying under vacuum over P$_2$O$_5$, was relatively inactive as a catalyst for epoxide polymerization due to excessive amount of ionizable chlorine being present and in contrast, if the zinc hexacyanoferrate was thoroughly washed with hot water as shown above, the dried precipitate did copolymerize propylene oxide and allyl glycidyl ether at 80° C. However, the molecular weight of the polymer was relatively low, and the efficiency of the catalyst was poor—only 200 g. polymer/g. catalyst.

*Example 2.—Dioxane zinc hexacyanoferrate (III) as catalyst*

A. K$_3$Fe(CN)$_6$ (28.3 g., 0.0861 mole) dissolved in 200 ml. water was added slowly to a solution containing zinc chloride (19.35 g., 0.142 mole) in 75 ml. water. This was equivalent to using a 10 mol percent excess of zinc chloride. The precipitated zinc hexacyanoferrate was separated by centrifugation and washed four times with 200 ml. portions of anhydrous, peroxide-free dioxane and dried at room temperature at <1 mm. Hg. Elemental analysis showed that the complex was essentially Zn$_3$[Fe(CN)$_6$]$_2$·3.1 C$_4$H$_8$O$_2$·1.6 H$_2$O; and infrared analysis confirmed the presence of complexed dioxane. According to the infrared spectrum of the total iron in the complex 45% was Fe(II). This catalyst complex was then used to polymerize PO and to copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.2 | 0.2 | 3.0 | 2.9 | 90 | 4.0 |
| 35 | 24 | 0.2 | 0.2 | 10.0 | 8.5 | 85 | 3.8 |
| 35 | 24 | 0.2 | 0.2 | | (5) | 93 | 3.8 |
| 35 | 24 | ¹ 0.2 | 0.2 | 3.0 | 2.7 | 93 | 4.4 |
| 35 | 24 | ¹ 0.1 | 0.1 | 3.0 | 1.4 | 68 | 5.0 |

¹ Washed with an additional volume of anhydrous dioxane before it was used for polymerization.

B. The zinc hexacyanoferrate prepared as in Example 2A above, was separated in a centrifuge tube and washed with only one 200-ml. portion of dioxane. Next, the precipitate was heated under vacuum at 35° C. in a solution containing 70 vol. percent dioxane and 30 vol. percent n-hexane in a distillation assembly equipped with a Dean and Stark trap to collect the distilled water. In this way, loosely bonded water was displaced from the complex. When no additional water collected, the hexane was distilled, and the complex was recovered from the dioxane solution by centrifugation and dried at <1 mm. Hg at room temperature. This complex was essentially Zn$_3$[Fe(CN)$_6$]$_2$·2.8 C$_4$H$_8$O$_2$·1.1 H$_2$O and contained 5.2% Cl, and only 11% of the iron was Fe(II). This catalyst was then used to polymerize PO and copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.2 | 0.2 | 3 | 3.4 | 88 | 3.8 |
| 35 | 48 | 0.2 | 0.15 | | (5) | 96 | 4.3 |

C. The zinc hexacyanoferrate prepared as in Example 2A above was separated and washed with two 200-ml. portions of 50 vol. percent dioxane in water and with two 200-ml. portions of pure dioxane. After drying at room temperature at <1 mm. Hg, the complex was used for the following polymerization of PO and AGE:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.2 | 3 | 3.4 | 48 | 3.0 |

A part of this catalyst preparation was dried by azeotropic distillation as described in Example 2B above. This complex was similar in composition to the above 2B preparation, except that it had only 1.0% Cl, but 55% of the iron was Fe(II). The catalyst was then used to polymerize PO and to copolymerize PO and AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.15 | 3 | 2.4 | 49 | 3.4 |
| 35 | 48 | 0.2 | 0.15 |  | (5) | 86 | 5.1 |

D. $ZnCl_2$ (5.97 g., 0.0438 mole) in 78 ml. water was added slowly to a solution of $K_3Fe(CN)_6$ (14.3 g., 0.0434 mole) in 38 ml. water. This was equivalent to a 48.6 mol percent excess (stoichiometric basis) of $K_3Fe(CN)_6$. The precipitated zinc hexacyanoferrate was treated with dioxane and dried as described in Example 2A above. Yield of dioxane complex: 14.9 g. Bulk density of powder: 0.287 g./ml. The catalyst was then used to polymerize PO and to copolymerize PO and AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 25 | 24 | 0.2 | 0.2 | 3.0 | 2.6 | 77 | 4.4 |
| 35 | 24 | 0.2 | 0.2 | 3.0 | 3.0 | 86 | 4.0 |
| 35 | 24 | 0.2 | 0.2 | 6.0 | 5.3 | 83 | 4.1 |
| 35 | 24 | 0.2 | 0.2 |  | (5) | 91 | 4.0 |

E. $ZnCl_2$ (23.9 g., 0.175 mole) in 95 ml. water was added rapidly to a solution of $K_3Fe(CN)_6$ (44.0 g., 0.1336 mole) in 308 ml. water. This was equivalent to a 14.5 mol percent excess (stoichiometric basis) of $K_3Fe(CN)_6$. The precipitated zinc hexacyanoferrate was treated with dioxane and dried as described in Example 2A above. According to elemental analysis, this complex was essentially $Zn_3[Fe(CN)_6]_2 \cdot 2.5\ C_4H_8O_2 \cdot 1.1\ H_2O$ with 4.3% Cl, 3.9% K., and 61% of the iron was Fe(II). Bulk density of powder: 0.248 g./ml. This complex copolymerized PO and AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.2 | 3 | 3 | 90 | 4.2 |

In solution (20 wt. percent monomer), the following copolymers were prepared from this catalyst as follows:

| Solvent | Temp., °C. | Time, hrs. | Percent (Wt.) (1) Catalyst | Percent (Wt.) (2) PBNA | Mol percent AGE (3) Feed | Mol percent AGE (3) Polymer | Percent Conversion | Vis. (4) |
|---|---|---|---|---|---|---|---|---|
| Heptane | 35 | 48 | 0.2 | 0.2 | 3 | 2.3 | 51 | 3.1 |
| Pentane | 35 | 48 | 0.2 | 0.2 | 3 | 4.0 | 60 | 2.9 |

F. The zinc hexacyanoferrate prepared using a 3.3-fold excess of $ZnCl_2$, as in Example 1, above, was treated with dioxane and dried as described in Example 2A above. Infrared analysis indicated that this complex contained about 3 moles of dioxane per mole of $Zn_3[Fe(CN)_6]_2$, and 63% of the total iron was Fe(II). This complex copolymerized PO and AGE to the solid stage twice as fast as the complex in Example 2A, above:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.2 | 3.0 | 3.0 | 80 | 3.7 |

G. $ZnCl_2$ (9.68 g., 0.071 mole) dissolved in 75 ml. water was added rapidly to a stirred solution of $K_3Fe(CN)_6$ (52.0 g., 0.158 mole) in 200 ml. of water. This is equivalent to a 3.3-fold excess of $K_3Fe(CN)_6$. The precipitate was separated by centrifugation and washed four times with 400-ml. volumes of dioxane. After vacuum drying the complex copolymerized PO and AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.2 | 3 | 2.2 | 41 | 4.0 |
| 35 | 24 | ¹ 0.2 | 0.2 | 3 | 2.8 | 71 | 4.0 |

¹ Catalyst was washed with two additional volumes of dioxane before it was used for polymerization.

H. A mixture of $K_3Fe(CN)_6$ (26.5 g., 0.0818 mole) and $K_4Fe(CN)_6 \cdot 3\ H_2O$ (1.8 g., 0.0043 mole) was dissolved in 200 ml. water and added dropwise to a solution containing $ZnCl_2$ (19.3 g., 0.142 mole) in 75 ml. water. After the precipitate was separated, it was washed four times with a total of 660 ml. dioxane. According to infrared analysis, the dried precipitate contained about 3 moles of dioxane/mole of $Zn_3[Fe(CN)_6]_2$, and 65% of the total iron was Fe(II). This precipitate or catalyst was then used to copolymerize PO and AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.2 | 0.2 | 3.0 | 3.0 | 93 | 3.5 |

I. $K_3Fe(CN)_6$ (7.08 g., 0.0215 mole) was dissolved in 50 ml. water and added slowly to a solution of $$Zn(NO_3)_2 \cdot 6\ H_2O$$

(17.38 g., 0.0584 mole) in 48 ml. water. This is equivalent to an 81 mole percent excess of $Zn(NO_3)_2$. The precipitate was washed with dioxane and dried as in Example 2A above. Analysis by infrared showed that dioxane was incorporated, although less than the normal amount, and 46% of the total iron in the complex was Fe(II).

This complex was less effective as a catalyst in the copolymerization of PO and AGE as shown below:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 80 | 46 | 0.2 | 0.2 | 3 | 2.5 | 32 | 2.2 |

*Example 3.—Diethylene glycol diethyl ether (diglyet)-zinc hexacyanoferrate*

A. Zinc hexacyanoferrate (0.017 mole) prepared as in Example 2A above was separated and washed four times with 200-ml. portions of diglyet and then four times with 220-ml. portions of hexane. Elemental analysis of the vacuum-dried precipitate indicated that it was essentially $Zn_3[Fe(CN)_6]_2 \cdot 1.7\ C_8H_{18}O_3 \cdot 4.2\ H_2O$ with 3.1% Cl. According to infrared analysis, 78% of the iron in the complex was Fe(II). This complex was then used to copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.1 | 0.1 | 3 | 2.4 | 70 | 4.0 |
| 35 | 24 | 0.1 | 0.2 | 3 | 2.6 | 68 | 4.5 |

B. $K_3Fe(CN)_6$ (7.1 g., 0.0215 mole) in 50 ml. water was added slowly to a solution of $ZnCl_2$ (4.4 g., 0.032 mole) in 17 ml. water. After separation of the precipitate by centrifugation, the precipitate was washed in the centrifuge tube first with 75 ml. diglyet and then with a 75/5 (vol.) diglyet-water solution. Next, the precipitate was dried by azeotropic distillation, as described in Example 2B above, using a ½ (vol.) n-hexane-diglyet solution and washed twice with n-pentane. Analysis of the vacuum dried precipitate indicated that it was essentially $Zn_3[Fe(CN)_6]_2 \cdot 1.5\ C_8H_{18}O_3 \cdot 1.9\ H_2O$ with 3.2% Cl and, of the total iron in the complex, 74% was Fe(II). This catalyst was then used to polymerize PO and to copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.1 | 0.1 | 3.0 | 2.0 | 84 | 5.4 |
| 35 | 24 | 0.025 | 0.2 | 3.0 | 1.1 | 28 | 3.9 |
| 35 | 24 | 0.1 | 0.2 | 6.0 | 3.5 | 72 | 4.4 |
| 35 | 24 | 0.1 | 0.2 | -------- | (5) | 89 | 6.6 |

C. The catalyst preparation of Example 3B above was repeated, but the $ZnCl_2$ solution was added to the $K_3Fe(CN)_6$ solution. Analysis of the dried precipitate showed that it was essentially $$Zn_3[Fe(CN)_6]_2 \cdot 2.5\ C_8H_{18}O_3 \cdot 2.5\ H_2O$$

with 2.9% Cl. According to infrared analysis, 80% of the total iron in the complex was Fe(II). This complex copolymerized PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.1 | 0.1 | 3.0 | 1.6 | 83 | 4.0 |
| 35 | 48 | 0.025 | 0.2 | 3.0 | 1.0 | 17 | 3.6 |

*Example 4.—Ethylene glycol dimethyl ether (glyme)-zinc hexacyanoferrate*

Zinc hexacyanoferrate (0.0032 mole), prepared as in Example 2A above, was washed in a centrifuge tube with four 100-ml. volumes of glyme and then with two volumes of n-pentane. The vacuum-dried complex had 2.6 moles of glyme per mole of $Zn_3[Fe(CN)_6]_2$, and 53% of the total iron in the complex was Fe(II). PO and AGE were copolymerized using this catalyst as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.1 | 0.2 | 3.0 | 1.5 | 69 | 4.3 |

*Example 5.—Triethylene glycol dimethyl ether (triglyme)-zinc hexacyanoferrate*

Zinc hexacyanoferrate (0.0086 mole), prepared as in Example 2A, above, was washed in a centrifuge tube with four 200-ml. volumes of triglyme and then with two volumes of n-pentane. Elemental analysis indicated that this complex was essentially $$Zn_3[Fe(CN)_6]_2 \cdot 3.1\ C_8H_{18}O_9 \cdot 1.9\ H_2O$$

with 3.0% Cl. However, infrared analysis suggested that some of the occluded ether was not removed by the pentane washing. PO and AGE were copolymerized with this catalyst complex as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.1 | 0.2 | 3.0 | 1.3 | 63 | 4.1 |

*Example 6.—Diethylene glycol dimethyl ether (diglyme)-zinc hexacyanoferrate*

A. Zinc hexacyanoferrate (0.0108 mole), prepared as in Example 2A, above, was washed successively with four 200-ml. volumes of diglyme and two volumes of pentane. Elemental analysis of the vacuum-dried precipitate indicated that it was essentially $$Zn_3[Fe(CN)_6]_2 \cdot 2.7\ C_6H_{14}O_3 \cdot 2.1\ H_2O$$

with 4.0% Cl and, according to infrared analysis, 68% of the total iron in the complex was Fe(II). This catalyst was then used to polymerize PO and to copolymerize PO and AGE as follows:

| Temp., °C. | Time, hrs. | Percent (Wt.) (1) Catalyst | Percent (Wt.) (2) PBNA | Mol Percent AGE (3) | | Percent Conversion | Vis. (4) |
|---|---|---|---|---|---|---|---|
| | | | | Feed | Polymer | | |
| 35 | 24 | 0.05 | 0.05 | 3.0 | 1.8 | 51 | 5.3 |
| 35 | 24 | 0.025 | 0.025 | 3.0 | 1.2 | 23 | 5.4 |
| 35 | 24 | 0.025 | 0.012 | -------- | (5) | 26 | 6.2 |
| 35 | 24 | 0.025 | 0.025 | -------- | (5) | 28 | 6.3 |
| 35 | 24 | 0.025 | 0.10 | -------- | (5) | 38 | 7.0 |

B. A mixture of zinc hexacyanoferrate (0.0113 mole) and water, prepared as in Example 2A above, was stirred for 24 hours in a capped centrifuge bottle under a nitrogen atmosphere. After the hexacyanoferrate was separated by centrifugation and dried over $P_2O_5$ at 1 mm. Hg, it was washed first with a diglyme-water solution (190/19 vol.) and then, successively, with three 200-ml. volumes of diglyme and two volumes of n-pentane. Elemental analysis of the vacuum-dried complex indicated that it was essentially $Zn_3[Fe(CN)_6]_2 \cdot 2.2\ C_6H_{14}O_3 \cdot 2.6\ H_2O$ with 5.5% Cl. According to infrared analysis, 73% of the total iron in the complex was Fe(II). This complex polymerized PO as follows:

| Temp., °C. | Time, hrs. | Percent (Wt.) (1) Catalyst | Percent (Wt.) (2) PBNA | Percent Conversion | Vis. (4) |
|---|---|---|---|---|---|
| 35 | 24 | 0.025 | 0.012 | 16 | 5.3 |

C. Zinc hexacyanoferrate (0.0108 mole) was prepared as in Example 2A above. However, 75 ml. diglyme was added to the water slurry before the precipitate was separated by centrifugation. Thus, the solution contained 52 vol. percent diglyme. After the precipitate was separated, it was washed eight times with a 90/10 (vol.) diglyme-water solution. The total volume of wash liquid was 1135 ml., and the last wash gave only a negligible test for Cl⁻. Next, the precipitate was dried by azeotropic distillation, as described in Example 2B above, using a ½ (vol.) n-heptane-diglyme solution. When no additional water collected in the trap, the precipitate was separated and extracted in a Soxhlet extractor with n-pentane for 24 hours. The resulting vacuum-dried precipitate was essentially $$Zn_3[Fe(CN)_6]_2 \cdot 2.3\ C_6H_{14}O_3 \cdot 3.7\ H_2O$$

with 7.7% Cl and, of the total iron in the complex, 71% was Fe(II). The high Cl content of this complex, in spite of the many washes with diglyme and water and infrared analysis suggest that Cl is covalently bonded. Moreover, metal analysis of this complex shows that the Zn/Fe ratio was 1.8 instead of 1.5. This catalyst complex was then used to polymerize PO and to copolymerize PO and AGE or AGE as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 35 | 24 | 0.02 | 0.02 | ------ | (5) | 46 | 6.9 |
| 35 | 24 | 0.02 | 0.02 | 3.0 | 2.0 | 42 | 6.3 |
| 35 | 24 | 0.015 | 0.015 | 3.0 | 1.6 | 30 | 5.4 |
| 35 | 24 | 0.01 | 0.01 | 3.0 | 1.3 | 18 | 5.4 |
| 35 | 24 | 0.02 | 0.01 | 3.0 | 2.1 | 42 | 5.6 |
| 35 | 24 | 0.02 | (¹) | 3.0 | 1.3 | 40 | 5.2 |
| 35 | 24 | 0.02 | 0.02 | 6.0 | 2.9 | 37 | 5.2 |
| 35 | 24 | 0.025 | 0.025 | 10.0 | 4.9 | 42 | 4.9 |
| 45 | 24 | 0.015 | 0.015 | 3.0 | 1.8 | 22 | 4.8 |
| 25 | 24 | 0.02 | 0.02 | 3.0 | 1.5 | 47 | 5.8 |
| 25 | 24 | 0.02 | 0.02 | 6.0 | 2.9 | 44 | 5.0 |
| 35 | 5.5 | 0.02 | 0.02 | 3.0 | 1.4 | 34 | 5.2 |
| 25 | 48 | 0.04 | 0.02 | (²) | (²) | ³90 | 1.2 |

¹ Polymerization carried out in the absence of light, and PBNA was added afterward.
² 100% AGE, no propylene oxide.
³ Unsaturation (m. moles (g.) found: 8.51; theoretical: 8.77. Gel free.

*Example 7.—Iron hexacyanoferrate*

A. $K_4Fe(CN)_6 \cdot 3H_2O$ (44.2 g., 0.105 mole) in 295 ml. water was added to a 10 mol percent excess of FeCl₃ (24.9 g., 0.1536 mole) in 167 ml. water and "Prussian Blue" precipitated. One portion of this blue precipitate was dried at room temperature over $P_2O_5$ at <1 mm. Hg. This complex was used to copolymerize AGE and PO as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 80 | 96 | 0.2 | 0.2 | 3.0 | 1.6 | 29 | 0.9 |

B. Another portion of the blue precipitate from Example 7A above was washed with four volumes of dioxane in a centrifuge tube. According to infrared analysis of the vacuum-dried precipitate, little or no dioxane was incorporated in the hexacyanoferrate. 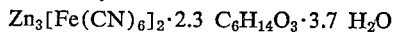 Polymerization of PO and AGE with this complex catalyst is summarized below:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 80 | 48 | 0.2 | 0.2 | 3.0 | 3.0 | 66 | 1.0 |

C. A 15% aqueous solution of $K_3Fe(CN)_6$ (18.4 g., 0.056 mole) was added to a 15% aqueous solution of FeCl₃ (10.0 g., 0.062 mole), which was equivalent to a 10 mol percent excess of the latter. The precipitate was brown at first but rapidly turned green as it evolved chlorine. The precipitate was separate by centrifugation and washed with four volumes of dioxane. Infrared analysis of the vacuum-dried complex showed that no dioxane was incorporated and that most of the iron was in some resonance-stabilized form between $Fe^{+2}$ and $Fe^{+3}$, identical to the form in Example 7B, above. This complex copolymerized AGE and PO as follows:

| Temp., °C. | Time, hrs. | Percent (Wt.) (1) Catalyst | Percent (Wt.) (2) PBNA | Mol Percent AGE (3) Feed | Mol Percent AGE (3) Polymer | Percent Conversion | Vis. (4) |
|---|---|---|---|---|---|---|---|
| 80 | 96 | 0.2 | 0.2 | 3.0 | 2.7 | 89 | 1.5 |

In Examples 1 to 7, above, the dried catalyst, generally an equal weight of PBNA (phenyl β-naphthylamine), and a magnetic stirring bar were charged into a dry, crown-capped beverage bottle. The bottle was capped and evacuated at <1 mm. Hg for one hour to remove any occluded moisture and, finally, the monomers were charged into the evacuated bottle. Polymerization was carried out in a constant temperature bath. The monomer-catalyst slurry was agitated by a magnetic stirrer, and agitation was stopped when the polymers began to solidify. The PO and AGE were purified before being charged to the evacuated polymerization bottle by careful fractionation. Analysis by Karl Fischer reagent showed that the monomers contained less than 10 p.p.m. water. Pressure in the bottles at the beginning of polymerization was about 1 atmosphere or slightly less. Notes: (1) based on weight of monomer(s) charged to the polymerization bottle; (2) based on the weight of the monomer(s) charged to the polymerization bottle; (3) mol percent of allyl glycidyl ether charged to the polymerization bottle and in the resulting polymer, balance being propylene oxide; (4) intrinsic viscosity in isopropanol at 60° C.; and (5) 100 mol percent propylene oxide, no allyl glycidyl ether was used in this rung.

*Example 8*

Still other polymerization of cyclic oxides were conducted with catalysts prepared generally according to the foregoing methods. For example, zinc ferricyanide was prepared as described supra. To the slurry of the precipitate in $H_2O$, acetone was added. The cyanide complex precipitate was then removed from the water-acetone media and washed four times with acetone. This catalyst was used to polymerize propylene oxide by methods similar to the foregoing as follows:

| Catalyst Conc., wt. percent on Monomer | Pzn. Temp., °C. | Reaction Time, Hrs. | Percent Conversion | Inherent Viscosity ¹ |
|---|---|---|---|---|
| 0.1 | 25 | 24 | 41 | 5.62 |
| 0.2 | 25 | 24 | 75 | 5.08 |

¹ Measured in benzene at approximately 0.05 g. polymer/100 cc. benzene.

When the same procedure was followed except that methyl ethyl ketone was used in place of the acetone and except that the MEK was not added to the water-precipitate slurry the following results were obtained:

| Catalyst Conc., wt. percent on Monomer | Pzn. Temp., °C. | Reaction Time, Hrs. | Percent Conversion | Inherent Viscosity [1] |
|---|---|---|---|---|
| 0.3 | 25 | 96 | 14 | (2) |
| 0.5 | 25 | 96 | 37 | 3.36 |

[1] Measured in benzene at approx. 0.10 g. polymer/100 cc. benzene.
[2] Not determined.

In an alternative procedure the zinc ferricyanide precipitate in $H_2O$ was mixed with alcohol, filtered, washed with acetone, vacuum dried at room temperature to remove occluded acetone, $H_2O$ etc. and heated in a stream of $N_2$ (lamp grade) at about 100° C. to remove more $H_2O$, acetone etc. although temperatures up to about 200° C. for 5 hours have been used. One gram of this treated catalyst provided 135 g. of a copolymer of PO and AGE having an inherent viscosity in benzene of 3.84 after 24 hours at 30° C. When the step of heating the catalyst in a stream of hot $N_2$ was omitted, the catalyst was so active that the polymerization bottles ruptured.

*Example 9*

$ZnCl_2$ was reacted in aqueous media with $$Na_2Fe(CN)_5NO$$

to provide a catalyst having the general base formula $ZnFe(CN)_5NO$. The catalyst was separated from the water, washed with acetone and vacuum dried at room temperature. This treated catalyst was then used to polymerize propylene oxide by methods similar to the above procedures as follows:

| Catalyst, Wt. percent on Monomer | React. Temp., °C. | Time, Hrs. | Percent Conversion | Remarks |
|---|---|---|---|---|
| 0.10 | 80 | 24 | 35 | Grease. |
| 1.00 | 80 | 24 | 98 | Do. |

*Example 10*

$ZnCl_2$ was reacted in aqueous media with $K_3Co(CN)_6$ to give a precipitated catalyst having the base formula $Zn_3[Co(CN)_6]_2$. The resulting precipitate was separated from the water, washed with acetone and vacuum dried at room temperature. The catalyst was then used to polymerize propylene oxide by methods similar to the foregoing as follows:

| Catalyst, Wt. percent on Monomer | React. Temp., °C. | Time, Hrs. | Percent Conversion | Inherent Viscosity [1] |
|---|---|---|---|---|
| 0.10 | 25 | 24 | 27 | 3.11 |
| 0.20 | 25 | 24 | 82 | 3.25 |

[1] Measured in benzene at approximately 0.10 g. polymer/100 cc. benzene.

*Example 11*

A catalyst having the general base formula $$Ni_3(Fe(CN)_6)_2$$

was prepared by methods similar to the above. After separation of the catalyst from the water, one portion was washed with acetone and the other portion was washed with dioxane. The thus treated catalysts were then used for the polymerization of propylene oxide generally according to the preceding methods as follows:

| Catalyst Treat. Agent | Weight percent Cat. on Monomer | Temp., °C. | Time, Hrs. | Percent Conversion | Remarks |
|---|---|---|---|---|---|
| Acetone | 0.5 | 80 | 48 | 34 | Light grease. |
| Dioxane | 0.5 | 80 | 48 | 18 | Do. |

*Example 12*

Several catalysts were prepared by reacting an excess of $ZnCl_2$ separately with $Ca_3[Co(CN)_6]_2$, $K_3Co(CN)_6$, $Na_3Co(CN)_6$ and $Li_3Co(CN)_6$. The precipitated catalysts were washed with acetone and vacuum dried at room temperature. They were then used to polymerize propylene oxide generally according to the methods described supra as follows:

| Salt Used to React With $ZnCl_2$ | Weight Percent, Cat. on Monomer | React. Time, Hrs. | React. Temp., °C. | Percent Conversion | Inherent Viscosity |
|---|---|---|---|---|---|
| $Ca_3[Co(CN)_6]_2$ | 0.08 | 96 | 25 | 100 | [1] 1.82 |
| $K_3Co(CN)_6$ | 0.2 | 24 | 25 | 82 | [2] 3.25 |
| $Na_3Co(CN)_6$ | 0.5 | 24 | 25 | 92 | [3] <1 |
| $Li_3Co(CN)_6$ | 0.5 | 72 | 25 | 80 | [3] <1 |

[1] In isopropanol.
[2] In benzene at approximately 0.10 g. polymer/100 cc. benezene.
[3] Estimated.

This example shows that other CN salts can be reacted with $ZnCl_2$ to make catalysts.

*Example 13*

$K_3Fe(CN)_6$ was reacted in aqueous media with various zinc salts to make precipitates which were filtered from the media, washed with acetone and vacuum dried at room temperature. The resulting catalysts were then used to polymerize propylene oxide by methods similar to the foregoing as follows:

| Zn Salt Used to Prepare Catalyst | Pzn. Temp., °C. | Weight Percent, Catalyst on Monomer | Yield, Percent |
|---|---|---|---|
| $ZnCl_2$ | 25 | 0.1 | 41 |
| $ZnBr_2$ | 25 | 0.2 | 40 |
| $Zn(C_2H_3O_2)_2$ | 80 | 0.2 | 57 |
| $Zn(NO_3)_2$ | 80 | 0.5 | 20 |

These results show that other zinc salts can be used in the preparation of useful catalysts.

*Example 14*

$Ag_3Fe(CN)_6$ was reacted in $H_2O$ with $CaCl_2$ to give $CaFe(CN)_6$. The calcium ferricyanide was then reacted in $H_2O$ with $ZnCl_2$ to give a zinc ferricyanide precipitate which was washed four times with dioxanes. 0.1 g. of this dioxane washed $Zn_3[Fe(CN)_6]_2$ catalyst was placed in a polymerization bottle, and 10 g. (11.2 ml.) of oxetane was added. Polymerization was conducted in the capped polymerization bottle without solvent under nitrogen for 77 hours at 80° C. to give a yield of 92% polymer. The resulting oxetane polymer was a fairly crystalline solid and became sticky when handled in the fingers. It had a viscosity in isopropanol of 0.234 and an ash of 0.49%.

Example 15

Zinc hexacyano cobaltate (III) was prepared in aqueous media as follows:

$$Ca[Co(CN)_6]_2 + 3ZnCl_2 \rightarrow Zn_3[Co(CN)_6]_2 + 3CaCl_2$$

The precipitate obtained was for three times washed with acetone and centrifuged. It was finally vacuum dried at room temperature. It was pulverized and gave a white powder. 0.1 g. of this acetone washed powdered $$Zn_3[Co(CN)_6]_2$$

catalyst was placed in a polymerization bottle, and then 10 g. of oxetane was added. Polymerization was conducted in the capped polymerization bottle under nitrogen without solvent for 41 hours at 80° C. to give a yield of polymer of 87%. This oxetane polymer had a viscosity in isopropanol of 0.72 and an ash of 0.83%. The polymer was a rubbery clear gum and was somewhat snappy.

Example 16

A $Zn_3[Co(CN)_6]_2$ catalyst using acetone as the complexing agent was prepared in a manner similar to that of the preceding example. 0.04 wt. % of this catalyst on the weight of the monomer, 1,2-butene oxide, under nitrogen in a capped polymerization bottle at 25° C. for 24 hours gave a yield of 60% of a tacky solid of homopoly 1,2-butene oxide.

Example 17

A series of bulk polymerizations under nitrogen were conducted using a zinc hexacyanoferrate(III) catalyst to make copolymers. The polymerization conditions and results obtained are shown below:

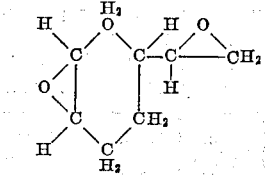

and DPDO, dipentene dioxide

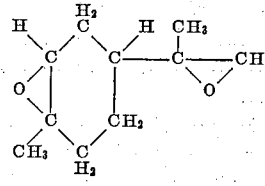

The catalyst, zinc hexacyanoferrate(III), used in this example was prepared in the same manner as shown in Example 6C, supra.

Example 18

Samples of propylene oxide-allyl glycidyl ether copolymers prepared generally according to the foregoing examples in which zinc hexacyanoferrate was the catalyst, and wherein phenyl beta naphthyl amine as an antioxidant was included on the polymerization recipe in an amount by weight about equal to the catalyst, and dioxane or diglyme was the organic complexing agent were processed, compounded and cured. In processing, these copolymers (raw gum stocks) were glass clear, possessed an appreciable nerve and showed signs of cold flow when subjected to permanent extension. Their (raw gum stock) mill behavior was excellent with the formation of the desired rolling bank. Dispersion of carbon black in the copolymers proceeded normally and reached a level showing a black glass clear cut (similar to natural rubber). These copolymers were then compounded, cured (at 300 to 320° F. for from 11 to 220 minutes, most at 90 minutes) and tested as shown in Table A below:

| Monomers | Ratio Mons. | Cat. Conc., Wt. Percent | Reaction | | Initial Press., p.s.i. | Percent Conv. | Epox. Cont. (m.mols/g.) | Intr. Vis. (dl./g.) |
| --- | --- | --- | --- | --- | --- | --- | --- | --- |
| | | | Time | Temp., °C. | | | | |
| PO-BDDO | 98/2 | 0.05 | 24 | 25 | 10 | 37.8 | 0.21 | 3.24 |
| PO-BDDO | 98/2 | 0.05 | 48 | 25 | 10 | 39.9 | 0.27 | 3.39 |
| PO-BDDO | 95/5 | 0.05 | 24 | 25 | 10 | 20.6 | 0.49 | 1.66 |
| PO-BDDO | 98/2 | 0.10 | 24 | 25 | 10 | 73.8 | 0.17 | 3.70 |
| PO-VCHDO | 98/2 | 0.05 | 24 | 25 | 10 | 48.0 | 0.022 | 1.50 |
| PO-DPDO | 98/2 | 0.05 | 24 | 25 | 10 | 50.0 | 0.017 | 1.38 |

NOTES—PO-propylene oxide; BDDO-butadiene dioxide; VCHDO-vinyl cyclohexene dioxide

TABLE A

| Ingredients | Amounts by Weight—Runs A Through E | | | | |
| --- | --- | --- | --- | --- | --- |
| | Run A | Run B | Run C | Run D | Run E |
| Copolymer of Propylene Oxide and Allyl glycidyl ether | [1] 100.0 | [1] 100.0 | [2] 100.0 | [2] 100.0 | [2] 100.0 |
| NBC Antioxidant [3] | | | 1.0 | 1.0 | 1.0 |
| ISAF Black | | | | | |
| HAF Black | 40.0 | 40.0 | 40.0 | 40.0 | 40.0 |
| Zinc Oxide | 5.0 | 5.0 | 3.0 | 3.0 | 3.0 |
| Stearic acid | 1.0 | 1.0 | 1.0 | 1.0 | 1.0 |
| MBT [4] | 1.5 | 2.0 | | | |
| Tellurac [5] | 1.5 | | | | |
| DOTG [6] | | 2.0 | | | |
| Santocure [7] | | | | | |
| TMTMS (Monex) [8] | | | 1.2 | 1.2 | 1.2 |
| Sulfur | 1.5 | 1.5 | 0.8 | 0.8 | 0.8 |
| Raw Polymer ML-4' [9] | | | 60 | 52T | 42 |

See footnotes at end of table.

TABLE A—Continued

| Ingredients | Amounts by Weight—Runs A Through E | | | | |
|---|---|---|---|---|---|
| | Run A | Run B | Run C | Run D | Run E |
| Solution Viscosity (η) [10] | 3.1 | 3.1 | 6.7 | 5.0 | 4.2 |
| Actual unsaturation, mol percent | 2.1 | 2.1 | 1.7 | 1.9 | 2.5 |
| Allyl glycidyl ether in copolymer | 0.8 | 0.6 | 0.6 | | |
| Rate of vulcanization | 50 | 180 | 90 | 65 | 40 |
| Time needed to reach 300% modulus plateau, minutes | | | | | |
| Original Test Specimens Testing at Room Temperature: | | | | | |
| Hardness, Shore A | 69 | 69 | 59 | 56 | 56 |
| Modulus 300%, p.s.i | 1,350 | 1,200 | 700 | 600 | 700 |
| Tensile at break, p.s.i | 2,000 | 1,800 | 2,100 | 2,100 | 2,050 |
| Percent Elongation at break | 475 | 450 | 800 | 850 | 700 |
| Tear, p.i. (crescent) | | | | | |
| Tensile break set a/32 | | | | | |
| Goodrich Flexometer: | | | | | |
| Percent DCS | | | 1.5 | 2.1 | 1.2 |
| HBU, °F | | | 59 | 63 | 50 |
| Pico abrasion index | | | | | |
| Original Test Specimens Testing at 212° F.: | | | | | |
| Modulus at 300% E., p.s.i | 1,250 | 1,150 | | | |
| Tensile at break, p.s.i | 1,400 | 1,200 | | | |
| Percent Elongation at break | 350 | 350 | | | |
| Tear, p.i. (Crescent) | | | | | |
| Goodrich Flexometer: | | | | | |
| Percent DCS | | | | | |
| HBU, °F | | | | | |
| Compression Set, percent | | | 41.5 | 42.1 | 41.0 |
| Original Test Specimens Low Temperature Tests: | | | | | |
| 25% R from 250% | | | | | |
| Elongation at— | | | | | |
| 50% | | | | | |
| 75% | | | | | |
| TM at— | | | | | |
| −75° C.[11] | | | | | |
| −70 | | | | | |
| −65 | | | | | |
| −60 | | | | | |

| Ingredients | Amounts by Weight—Runs F Through J | | | | |
|---|---|---|---|---|---|
| | Run F | Run G | Run H | Run I | Run J |
| Copolymer of Propylene Oxide and Allyl Glycidyl Ether | [2] 100.0 | [2] 100.0 | [2] 100.0 | [2] 100.0 | [2] 100.0 |
| NBC Antioxidant [3] | 1.0 | 1.0 | 1.0 | 1.0 | 1.0 |
| ISAF Black | | | | 40.0 | 40.0 |
| HAF Black | 40.0 | 40.0 | 40.0 | | |
| Zinc Oxide | 3.0 | 3.0 | 3.0 | 3.0 | 3.0 |
| Stearic Acid | 1.0 | 1.0 | 1.0 | 1.0 | 1.0 |
| MBT [4] | | | | | |
| Tellurac [5] | | | | | |
| DOTG [6] | | | | | |
| Santocure [7] | 1.4 | 1.4 | | | |
| TMTMS (Monex) [8] | | 0.2 | 1.2 | 0.7 | 0.9 |
| Sulfur | 1.5 | 1.5 | 0.8 | 1.2 | 1.2 |
| Raw Polymer ML-4' [9] | 45 | 45 | 37 | 48 | 50 |
| Solution Viscosity (η) [10] | 5.4 | 5.4 | 3.7 | 5.0 | 6.5 |
| Actual unsaturation, mol percent | 3.9 | 3.9 | 4.0 | 7.8 | 4.4 |
| Allyl glycidyl ether in copolymer | | | | | |
| Rate of vulcanization | 0.9 | >1 | 0.6 | | 1.1 |
| Time needed to reach 300% modulus plateau, minutes | 180 | 90 | 40 | 40 | 40 |
| Original Test Specimens Testing at Room Temperature: | | | | | |
| Hardness Shore A | 60 | 60 | 58 | 66 | 65 |
| Modulus at 300% E, p.s.i | 800 | 800 | 250 | 1,175 | 950 |
| Tensile at break, p.s.i | 1,800 | 2,000 | 1,900 | 2,000 | 2,200 |
| Percent Elongation at break | 650 | 650 | 900 | 425 | 600 |
| Tear, p.i. (Crescent) | | | 300 | 350 | 410 |
| Tensile break set a/32 | | | 8 | 4 | 5 |
| Goodrich Flexometer: | | | | | |
| Percent DCS | | | 2.7 | 1.1 | 1.8 |
| HBU, °F | | | 67 | 49 | 56 |
| Pico abrasion index | | | 115 | 102 | 108 |
| Original Test Specimens Testing at 212° F.: | | | | | |
| Modulus at 300% E., p.s.i | | | | | |
| Tensile at break, p.s.i | | | | | |
| Percent Elongation at break | | | 320 | 200 | 300 |
| Tear, p.i. (Crescent) | | | | | |
| Goodrich Flexometer: | | | | | |
| Percent DCS | | | 9.1 | 3.9 | 5.6 |
| HBU, °F | | | 56 | 36 | 39 |
| Compression Set, percent | | | 45.8 | 37.5 | 49.2 |
| Original Test Specimens Low Temperature Tests: | | | | | |
| 25% R from 250% | | | −61 | −60 | −59 |
| Elongation at— | | | | | |
| 50% | | | −56 | −57 | |
| 75% | | | −51 | −52 | |
| TM at— | | | | | |
| −75° C.[11] | | | 17.0 | | 95.5 |
| −70 | | | 9.1 | | 28.6 |
| −65 | | | 2.7 | | 8.0 |
| −60 | | | 2.3 | | 2.0 |

[1] Dioxane as complexing agent.
[2] Diglyme as complexing agent.
[3] Contains as active ingredient nickel dibutyl dithiocarbamate.
[4] 2-mercapto benzothiazole.
[5] Tellurium diethyl dithiocarbamate.
[6] Di-ortho-tolylguanidine.
[7] N-cyclohexyl-2-benzothiazole sulfenamide.
[8] Tetramethyl thiuram monosulfide.
[9] Mooney viscosity, large rotor.
[10] Of raw gum stock, in isopropanol at 60° C.
[11] Torsional modulus, Clash-Berg.

The abrasion resistance data of these copolymers show that they have a good level of resistance against abrasion. Stress retraction data at low temperatures indicate that the degree of crystallinity in these polymers is very low, and they do not stiffen until at a very low temperature. The "TR" curves are steep, and the stiffening up occurs at about −65° C. as judged from the Clash-Berg curves. T–50 is close to −56° C. This means that these polymers can be used in a number of applications at very low temperatures. The data on hot tear of the polymers is satisfactory and the increase in test temperature to 205° F. decreases the moduli of the copolymers very little.

It is to be understood that in accordance with the patent laws and statutes, the particular compositions, products and methods disclosed herein are presented for purposes of explanation and that various modifications can be made in these compositions, products and methods without departing from the spirit of the present invention.

What is claimed is:

1. The method for making a polyether which comprises mixing at least one polymerizable organic cyclic oxide monomer having a ring of from 2 to 3 carbon atoms and one oxygen atom with a particulate catalyst and polymerizing said monomer through its cyclic oxide group to form a polyether in admixture with said catalyst, said catalyst being used in a minor amount by weight sufficient to polymerize said monomer to form said polymer and comprising a double metal cyanide complex compound wherein one of the metals of said complex compound is selected from the group consisting of Zn(II), Fe(II), Fe(III), Co(II), Ni(II), Mo(IV), Mo(VI), Al(III), V(IV), V(V), Sr(II), W(VI), W(IV), Mn(II), and Cr(III) and mixtures thereof, wherein the other metal of said complex compound is a metal selected from the group consisting of Fe(II), Fe(III), Co(II), Co(III), Cr(III), Cr(II), Mn(II), Mn(III), V(IV), and V(V), and mixtures thereof, and wherein said double metal cyanide complex compound has been treated with at least one organic material selected from the group consisting of an ester of a carboxylic acid, a cyclic ether and an acyclic aliphatic saturated monoether to improve the activity of said complex compound for the polymerization of said monomer, said organic material being inert to polymerization by said compound.

2. The method for making a polyether having an average molecular weight of at least 20,000 and which comprises mixing at least one polymerizable organic cyclic oxide monomer having a ring of from 2 to 3 carbon atoms and one oxygen atom with a particulate catalyst and polymerizing said monomer through its cyclic oxide group to form a polyether in admixture with said catalyst, said catalyst being used in a minor amount by weight sufficient to polymerize said monomer to form said polymer and comprising a double metal cyanide complex compound having the general formula:

$$M_a(K)_c \cdot (H_2O)_d \cdot (R)_e$$

where K is selected from the group consisting of $M'(CN)_b$ and $M'[(CN)_r(X)_t]_b$, where M is at least one metal selected from the group consisting of Zn(II), Fe(II), Fe(III), Co(II), Ni(II), Mo(IV), Mo(VI), Al(III), V(IV), V(V), Sr(II), W(IV), W(VI), Mn(II) and Cr(III), where M' is at least one metal selected from the group consisting of Fe(II), Fe(III), Co(II), Co(III), Cr(II), Cr(III), Mn(II), Mn(III), V(IV) and V(V), where X is at least one material selected from the group consisting of $F^-$, $Cl^-$, $I^-$, $OH^-$, NO, $O^{2-}$, CO, $H_2O$, $NO_2^-$, $Br^-$, $C_2O_4^{2-}$, $SO_4^{2-}$, $CNO^-$, $CNS^-$, $NCO^-$, and $NCS^-$, where R is at least one organic material having up to 18 carbon atoms, being substantially water miscible and being selected from the group consisting of an ester of a carboxylic acid, a cyclic ether, and an acyclic aliphatic saturated monoether, said organic material being inert to polymerization by $$M_a(K)_c \cdot (H_2O)_d$$

of said formula, where $a$, $b$ and $c$ are numbers whose values are functions of the valences and coordination numbers of M and M', the total net positive charge on M times $a$ being essentially equal to the total net negative charge on (K) times $c$, where $r$ is greater than $t$,
where $r$ is a number,
where $t$ is a number,
where $d$ is zero or a number, and
where $e$ is a number sufficient to increase the activity of $M_a(K)_c \cdot (H_2O)_d$ for the polymerization of said monomer.

3. The method according to claim 2 wherein said organic cyclic oxide monomer has one ring of two carbon atoms and one oxygen atom and from 2 to 25 carbon atoms, and where said complex compound is used in an amount of from about 0.001 to 10% by weight based on the total weight of said monomer material.

4. The method according to claim 3 wherein said formula of said complex compound
   M is Zn(II),
   M' is Fe(II) and Fe(III),
   $t$ is zero, and
   the sum of the coordinating atoms of $H_2O$ and R is equal to from about 0.1 to 5 g.-atoms per g.-atom of M.

5. The method according to claim 3 where R is a cyclic ether.

6. The method according to claim 5 where said ether is dioxane.

References Cited by the Examiner

UNITED STATES PATENTS

| | | | |
|---|---|---|---|
| 2,152,716 | 4/1939 | Van Wirt et al. | 106—304 |
| 2,434,578 | 1/1948 | Miller | 44—67 |
| 2,793,133 | 5/1957 | Verbeek | 106—304 |
| 2,870,101 | 1/1959 | Stewart | 260—2 |
| 3,031,462 | 4/1962 | Hieber | 260—340.6 |
| 3,127,358 | 3/1964 | Hill | 260—2 |
| 3,136,798 | 6/1964 | Maginn | 260—348 |

FOREIGN PATENTS 273,735 10/1928 Great Britain.

OTHER REFERENCES

Guar et al.: Chemical Abstracts, 47, 5292i–93 (1953).

WILLIAM H. SHORT, *Primary Examiner.*

TIMOTHY D. KERWIN, *Examiner.*

S. N. RICE, T. PERTILLA, *Assistant Examiners.*